US011536621B2

(12) United States Patent
Alspach et al.

(10) Patent No.: US 11,536,621 B2
(45) Date of Patent: Dec. 27, 2022

(54) METHODS AND SYSTEMS FOR CALIBRATING DEFORMABLE SENSORS USING CAMERA

(71) Applicant: Toyota Research Institute, Inc., Los Altos, CA (US)

(72) Inventors: Alexander Alspach, Somerville, MA (US); Naveen Suresh Kuppuswamy, Arlington, MA (US); Avinash Uttamchandani, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 296 days.

(21) Appl. No.: 16/836,482

(22) Filed: Mar. 31, 2020

(65) Prior Publication Data

US 2021/0302249 A1    Sep. 30, 2021

(51) Int. Cl.
*G01L 5/00* (2006.01)
*B25J 13/08* (2006.01)
(Continued)

(52) U.S. Cl.
CPC .......... *G01L 5/0066* (2013.01); *B25J 13/081* (2013.01); *G01B 11/16* (2013.01); *G01B 11/24* (2013.01); *G01L 5/226* (2013.01); *G06T 7/00* (2013.01)

(58) Field of Classification Search
CPC .... G01N 29/07; G01N 29/043; G01N 29/341; G01L 5/0066; B25J 13/081; G01B 11/16; G01B 11/24
(Continued)

(56) References Cited

U.S. PATENT DOCUMENTS 5,416,589 A * 5/1995 Lysogorski ............ G01B 11/24
356/600
7,043,960 B1 * 5/2006 Lueck ................... G01L 27/005
73/1.63
(Continued)

FOREIGN PATENT DOCUMENTS

CN       104271322 A  *  1/2015  ............ B25J 13/081
CN       108453766 A  *  8/2018  .......... B25J 15/0009
(Continued)

OTHER PUBLICATIONS

T. Sakuma, E. Phillips, G. A. G. Ricardez, M. Ding, J. Takamatsu, "A Parallel Gripper with a Universal Fingertip Device Using Optical Sensing and Jamming Transition for Maintaining Stable Grasps," 2019 IEEE/RSJ International Conference on Intelligent Robots and Systems (IROS), 2019, pp. 5814-5819, (Year: 2019).*
(Continued)

*Primary Examiner* — Alexander A Mercado
*Assistant Examiner* — Monica S Young
(74) *Attorney, Agent, or Firm* — Dinsmore & Shohl LLP

(57) ABSTRACT

A system for calibrating a deformable sensor is provided. The system includes a deformable sensor including a housing, a deformable membrane coupled to an upper portion of the housing, and an enclosure defined by the housing and the deformable member; an imaging sensor configured to capture an image of the deformable membrane of the deformable sensor; and a controller. The enclosure is configured to be filled with a medium. The controller is configured to: receive the image of the deformable membrane of the deformable sensor; determine whether a contour of the deformable membrane in the image of the deformable membrane of the deformable sensor corresponds to a predetermined contour; and adjust a volume of the medium in the enclosure of the deformable sensor in response to the
(Continued)

determination that the contour of the deformable membrane is different from the predetermined contour.

20 Claims, 13 Drawing Sheets

(51) Int. Cl.
　　*G01B 11/24*　　(2006.01)
　　*G01B 11/16*　　(2006.01)
　　*G06T 7/00*　　(2017.01)
　　*G01L 5/22*　　(2006.01)
(58) Field of Classification Search
　　USPC .......................................... 73/597; 356/243.4
　　See application file for complete search history.

(56) References Cited

U.S. PATENT DOCUMENTS

| | | | |
|---|---|---|---|
| 9,513,178 B2* | 12/2016 | Tar | G01L 1/24 |
| 9,916,491 B2 | 3/2018 | Bolea et al. | |
| 10,228,318 B1* | 3/2019 | Boyer | E04B 7/00 |
| 2010/0253650 A1* | 10/2010 | Dietzel | G01L 1/247 |
| | | | 73/800 |
| 2012/0261551 A1* | 10/2012 | Rogers | G02B 26/0825 |
| | | | 359/619 |
| 2016/0107316 A1* | 4/2016 | Alt | G01L 1/25 |
| | | | 901/1 |
| 2018/0075299 A1 | 3/2018 | Gerber et al. | |
| 2018/0161001 A1 | 6/2018 | Seip et al. | |
| 2019/0091871 A1 | 3/2019 | Alspach et al. | |
| 2021/0251714 A1* | 8/2021 | Prattichizzo | A61B 90/06 |

FOREIGN PATENT DOCUMENTS

| | | | | |
|---|---|---|---|---|
| CN | 114055501 A | * | 2/2022 | |
| GB | 2409515 A | * | 6/2005 | G02B 6/10 |
| JP | 2004361085 A | | 12/2004 | |
| JP | 5757724 B2 | | 7/2015 | |
| WO | 2015066260 A1 | | 5/2015 | |
| WO | 2017186705 A1 | | 11/2017 | |
| WO | WO-2019239331 A1 | * | 12/2019 | A61B 1/00082 |

OTHER PUBLICATIONS

Alspach, et al., "Soft-Bubble: A Highly Compliant Dense Geometry Tactile Sensor For Robot Manipulation", Arxiv Online Paper, URL: https://arxiv.org/ftp/arxiv/papers/1904/1904.02252.pdf, Submitted Apr. 3, 2019.

Kuppuswamy, et al., "Fast Model-Based Contact Patch And Pose Estimation For Highly Deformable Dense-Geometry Tactile Sensors", MIT paper, URL: http://groups.csail.mit.edu/robotics-center/public_papers/Kuppuswamy20.pdf, Published Sep. 19, 2019.

* cited by examiner

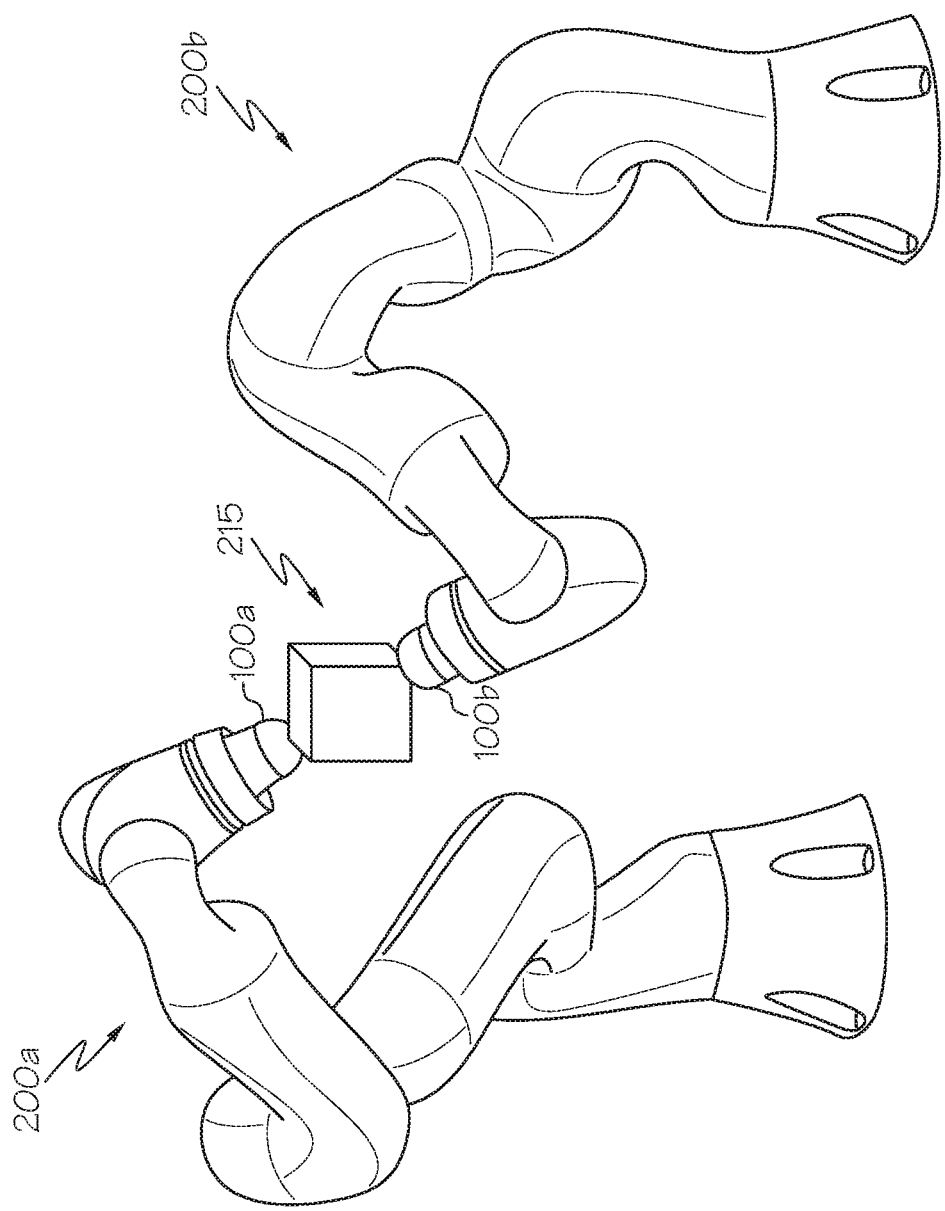

METHODS AND SYSTEMS FOR CALIBRATING DEFORMABLE SENSORS USING CAMERA

TECHNICAL FIELD

Embodiments described herein generally relate to calibrating contact sensors and, more particularly, to systems and methods for calibrating deformable contact and geometry/pose sensors using an imaging sensor.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors. Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, a deformable end effector may be desirable in robot-human interactions.

SUMMARY

In one embodiment, a system for calibrating a deformable sensor is provided. The system includes a deformable sensor including a housing, a deformable membrane coupled to an upper portion of the housing, and an enclosure defined by the housing and the deformable member; an imaging sensor configured to capture an image of the deformable membrane of the deformable sensor; and a controller. The enclosure is configured to be filled with a medium. The controller is configured to: receive the image of the deformable membrane of the deformable sensor; determine whether a contour of the deformable membrane in the image of the deformable membrane of the deformable sensor corresponds to a predetermined contour; and adjust a volume of the medium in the enclosure of the deformable sensor in response to the determination that the contour of the deformable membrane is different from the predetermined contour.

In another embodiment, a method for calibrating a deformable sensor is provided. The method includes receiving an image of a deformable membrane of the deformable sensor having an enclosure defined by a housing and the deformable membrane coupled to an upper portion of the housing, the enclosure configured to be filled with a medium; determining whether a contour of the deformable membrane in the image of the deformable membrane of the deformable sensor corresponds to a predetermined contour; and adjusting a volume of the medium in the enclosure of the deformable sensor in response to the determination that the contour of the deformable membrane is different from the predetermined contour.

In yet another embodiment, a controller includes one or more processors; one or more memory modules communicatively coupled to the one or more processors; and machine readable instructions stored in the one or more memory modules that, when executed by the one or more processors, cause the one or more processors to perform at least the following: receive an image of a deformable membrane of a deformable sensor having an enclosure defined by a housing and a deformable membrane coupled to an upper portion of the housing, the enclosure configured to be filled with a medium; determine whether a contour of the deformable membrane in the image of the deformable membrane of the deformable sensor corresponds to a predetermined contour; and adjust a volume of the medium in the enclosure of the deformable sensor in response to the determination that the contour of the deformable membrane is different from the predetermined contour.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 schematically depicts two example robots each having a deformable sensor and manipulating an object according to one or more embodiments described and illustrated herein;

DETAILED DESCRIPTION

Embodiments of the present disclosure are directed to calibrating a shape and/or size of deformable/compliant contact and/or geometry sensors (hereinafter "deformable sensors") that detect contact. In order to appropriately detect the pressure or force by the deformable sensors, the deformable membrane of the deformable sensor may be maintained at a desired shape and/size. Embodiments of the present disclosure calibrate the size and shape of the deformable sensors using an imaging sensor external to the deformable sensors or an imaging sensor embedded within the deformable sensors. Particularly, the present disclosure provides a system for calibrating a deformable sensor. Systems of the present disclosure include a deformable sensor including a housing, a deformable membrane coupled to an upper portion of the housing, and an enclosure defined by the housing and the deformable member; an imaging sensor configured to capture an image of the deformable membrane of the deformable sensor; and a controller. The enclosure is configured to be filled with a medium. The controller is configured to receive the image of the deformable membrane of the deformable sensor, determine whether a contour of the deformable membrane in the image of the deformable membrane of the deformable sensor corresponds to a predetermined contour, and adjust a volume of the medium in the enclosure of the deformable sensor in response to the determination that the contour of the deformable membrane is different from the predetermined contour. By adjusting the volume of the medium in the deformable sensor based on the comparison between the captured image and the predetermined contour, the embodiments appropriately sets the size and shape of the deformable sensor before detecting an object using the deformable sensor. This allows precise sensing of an external object by the deformable sensor.

Figure 1A:
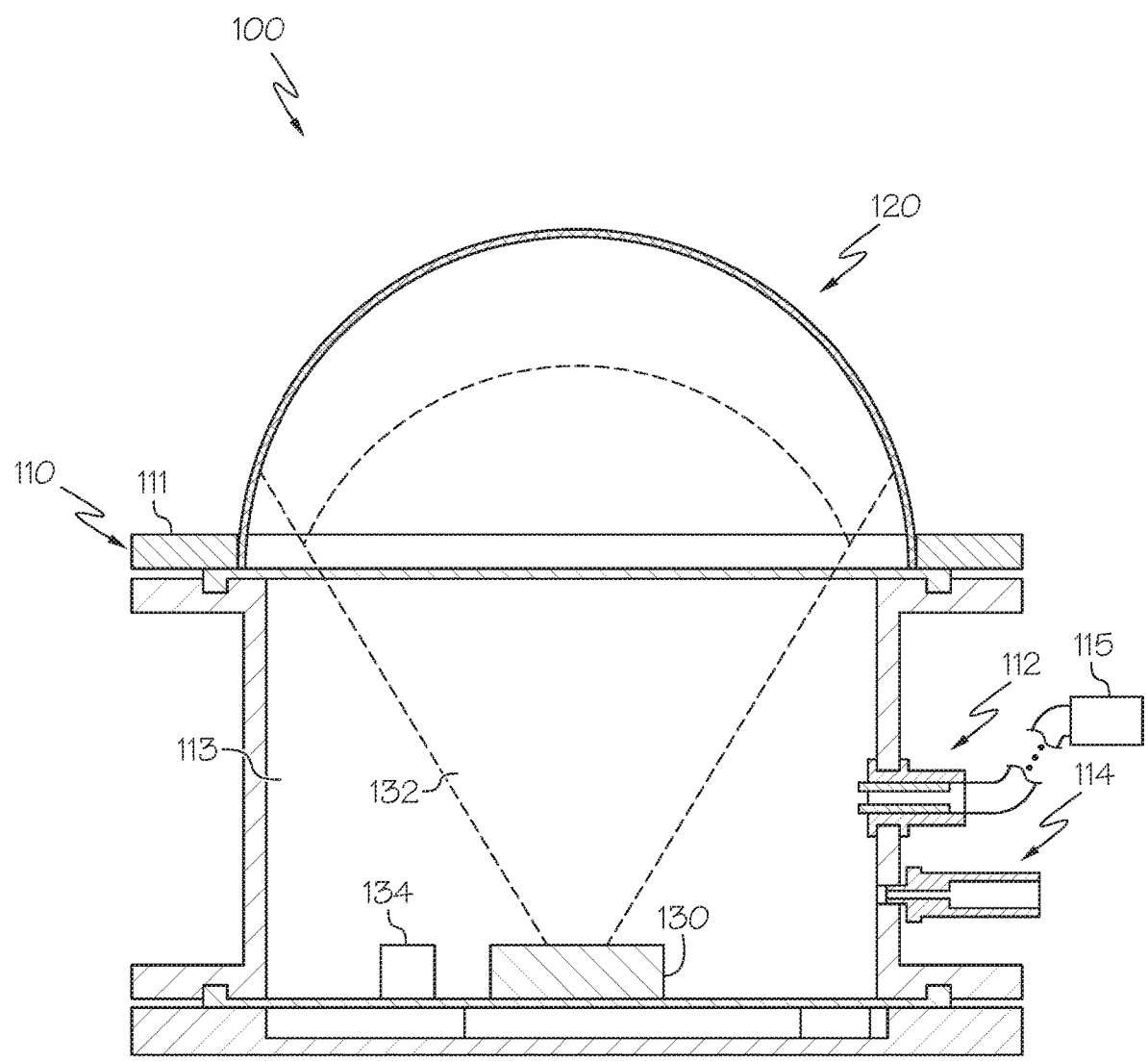
FIG. 1A schematically depicts an elevation view of an example deformable sensor according to one or more embodiments described and illustrated herein.
Figure 1B:
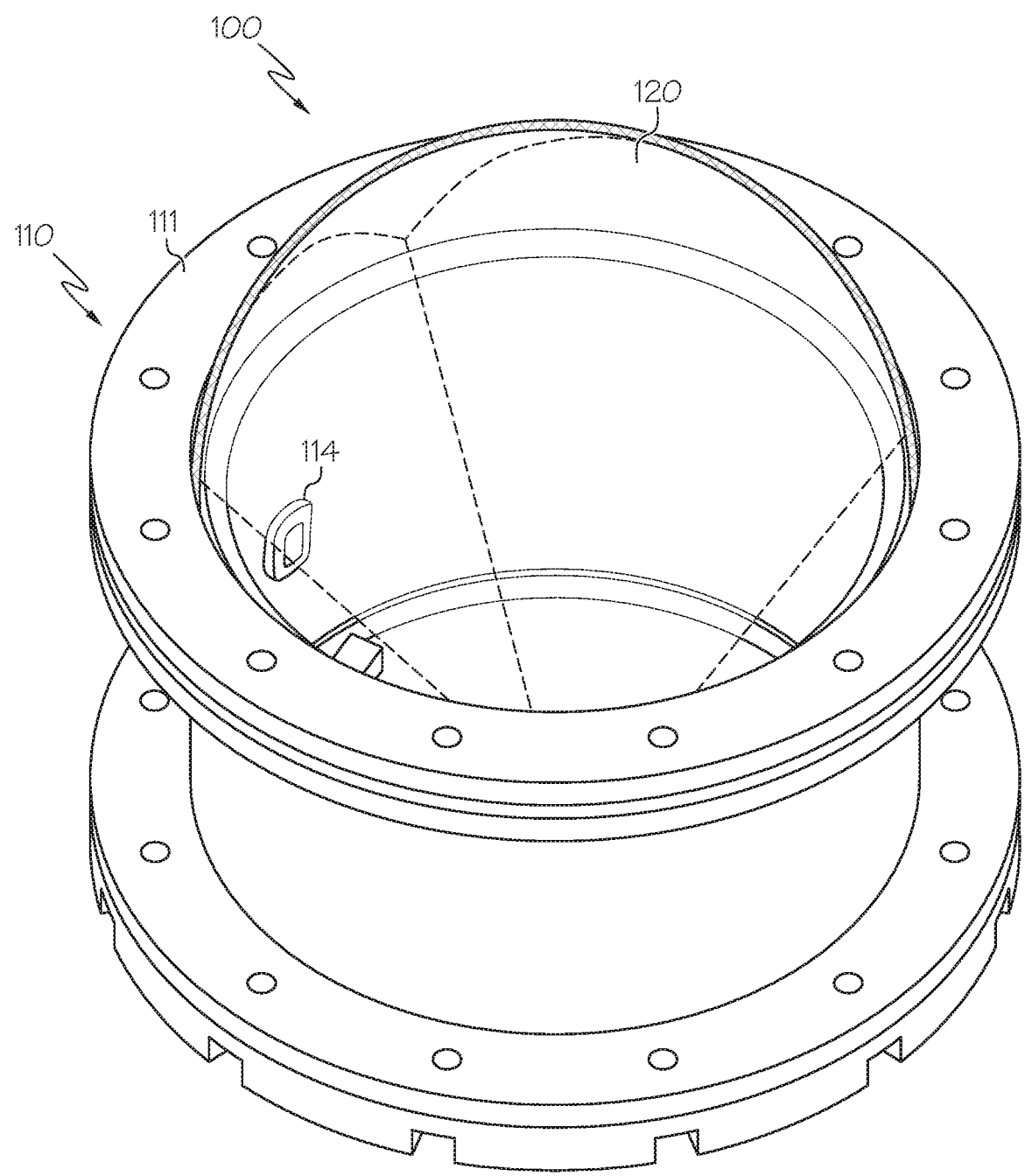
FIG. 1B schematically depicts a top perspective view of the example deformable sensor depicted by FIG. 1A according to one or more embodiments described and illustrated herein.

Referring now to FIGS. 1A and 1B, an example deformable sensor 100 is schematically illustrated. FIG. 1A is a front elevation view of the example deformable sensor 100 and FIG. 1B is a top perspective view of the example deformable sensor 100. The example deformable sensor 100 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. The passthrough 112 may be connected to a pump 115 which provides gas, such as air, into the enclosure 113 or sucks the gas from the enclosure 113 to adjust the shape and/or size of the deformable membrane 120. In another example, the medium is a gel, such as silicone or other rubber-like substance. In some embodiments a substance such as solid silicone may be cast in a given shape before assembly of the deformable sensor 100. In various embodiments, the medium may be anything that is transparent to an internal sensor (discussed in more detail below), such as to a wavelength of a time of flight sensor. The medium may include clear/transparent rubbers in some embodiments. In other embodiments, the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformability of the deformable sensor 100 may be tuned/modified by changing the material of the deformable membrane 120 and/or the pressure within the enclosure 113. By using a softer material (e.g., soft silicone), the deformable sensor 100 may be more easily deformed. Similarly, lowering the pressure within the enclosure 113 may also cause the deformable membrane 120 to more easily deform, which may in turn provide for a more deformable sensor 100. In some embodiments, robots feature varying touch sensitivity due to varying spatial resolution and/or depth resolution.

Figure 3:
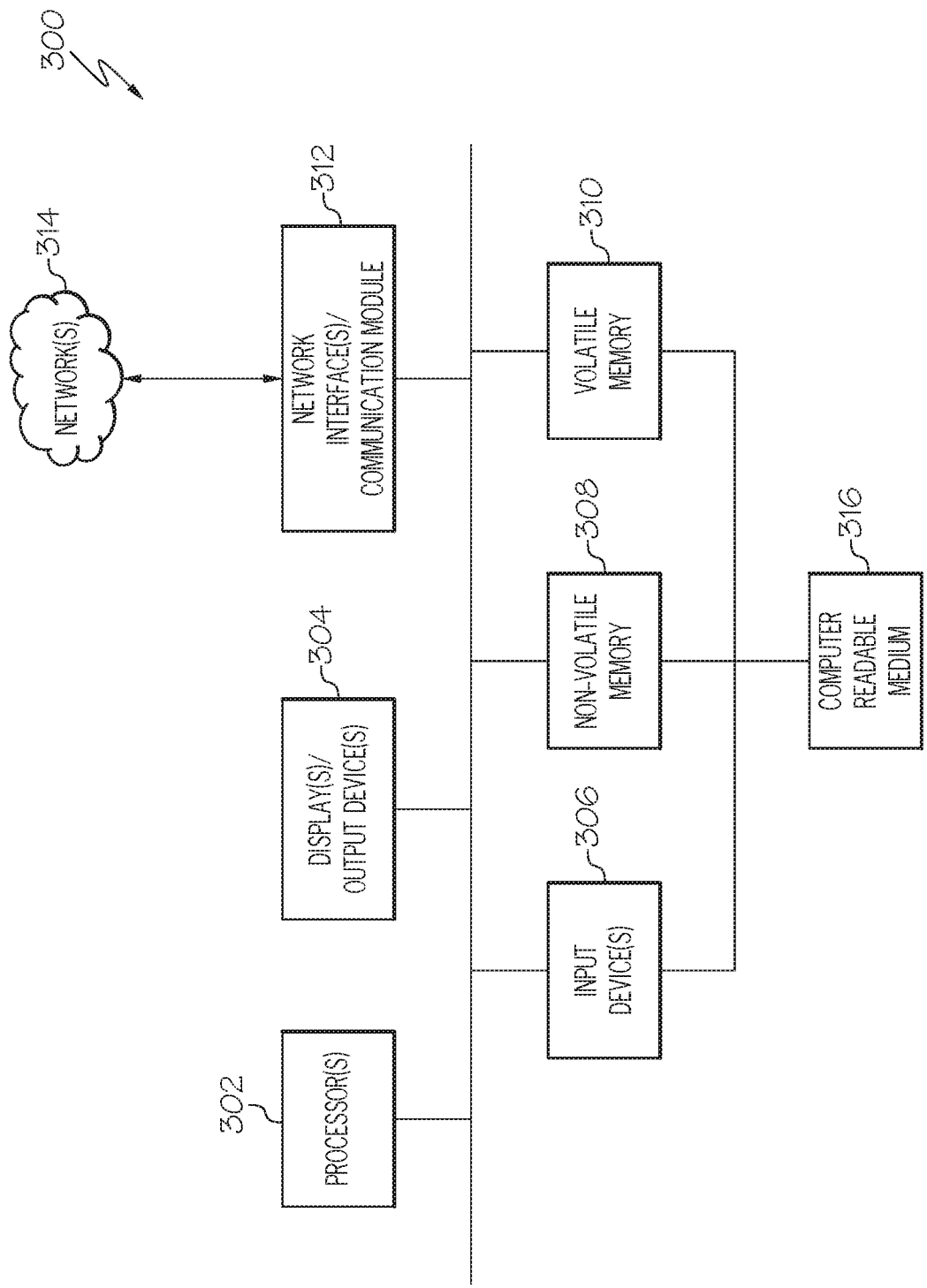
FIG. 3 is a block diagram illustrating example computing hardware utilized in one or more devices for implementing various processes and systems, according one or more embodiments described and illustrated herein.

An internal sensor 130 capable of sensing depth may be disposed within the enclosure 113, which may be measured by the depth resolution of the internal sensor 130. The internal sensor 130 may have a field of view 132 directed through the medium and toward a bottom surface of the deformable membrane 120. In some embodiments, the internal sensor 130 may be an optical sensor. As described in more detail below, the internal sensor 130 may be capable of detecting deflections of the deformable membrane 120 when the deformable membrane 120 comes into contact with an object. In one example, the internal sensor 130 is a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the internal sensor 130 may be changed. In some cases, low spatial resolution (e.g., one "pixel" that detects a single point's displacement) may be desired. In other examples, a sensitive time-of-flight sensor such may be used as a high spatial resolution internal sensor 130 that provides dense tactile sensing. Thus, the internal sensor 130 may be modular because the sensors may be changed depending on the application. FIG. 3 depicts an example time-of-flight sensor. A non-limiting example of a time-of-flight sensor is the Pico Flexx sold by PMD Technologies AG of Siegen, Germany. Other types of visual internal sensors include, by way of non-limiting example, stereo cameras, laser range sensors, structured light sensors/3d scanners, single cameras (such as with dots or other patterns inside), or any other suitable type of visual detector. For example, the internal sensor 130 may be configured as a stereo-camera capable of detecting deflections of the deformable membrane 120 by an object.

Any suitable quantity and/or types of internal sensors 130 may be utilized within a single deformable sensor 100 in some embodiments. In some examples, not all internal sensors 130 within a deformable sensor 100 need be of the same type. In various embodiments, one deformable sensor 100 may utilize a single internal sensor 130 with a high spatial resolution, whereas another deformable sensor 100 may use a plurality of internal sensors 130 that each have a low spatial resolution. In some embodiments, the spatial resolution of a deformable sensor 100 may be increased due to an increase in the quantity of internal sensors 130. In some examples, a decrease in the number of internal sensors 130 within a deformable sensor 100 can be compensated for by a corresponding increase in the spatial resolution of at least some of the remaining internal sensors 130. As discussed in more detail below, the aggregate deformation resolution may be measured as a function of the deformation resolution or depth resolution among the deformable sensors 100 in a portion of a robot. In some embodiments aggregate deformation resolution may be based upon a quantity of deformable sensors in a portion of the robot and a deformation resolution obtained from each deformable sensor in that portion.

Referring again to FIG. 1A, a conduit 114 may be utilized in the enclosure 113 to provide power and/or data/signals, such as to the internal sensor 130 by way of a conduit, such as for USB (universal serial bus) or any other suitable type of power and/or signal/data connection. As used herein, an airtight conduit may include any type of passageway through which air or any other fluid (such as liquid) cannot pass. In this example, an airtight conduit may provide a passageway through which solid object (such as wires/cables) may pass through by with an airtight seal being formed around such wires/cables at each end of the airtight conduit. Other embodiments utilized wireless internal sensors 130 to transmit and/or receive data and/or power. In various embodiments where the medium is not a gas, such as silicone, the enclosure 113 and/or conduit 114 may not necessarily be airtight.

In some embodiments, the deformable sensor 100 may include one or more internal pressure sensors 134 (barometers, pressure sensors, etc., or any combination thereof) utilized to detect the general deformation of the deformable membrane 120 through the medium. In some embodiments, the deformable sensor 100, the internal sensor 130, and/or the internal pressure sensors 134 may receive/send various data, such as through the conduit 114 discussed above, wireless data transmission (wi-fi, Bluetooth, etc.), or any other suitable data communication protocol. For example, pressure within the deformable sensor 100 may be specified by a pressurization parameter and may be inversely proportional to the deformability of the deformable sensor 100. In some embodiments the deformability of a deformable sensor 100 may be modified by changing pressure within the enclosure 113 or a material of the deformable membrane 120. In some embodiments, receipt of an updated parameter value may result in a real-time or delayed update (pressurization, etc.).

Figure 2:
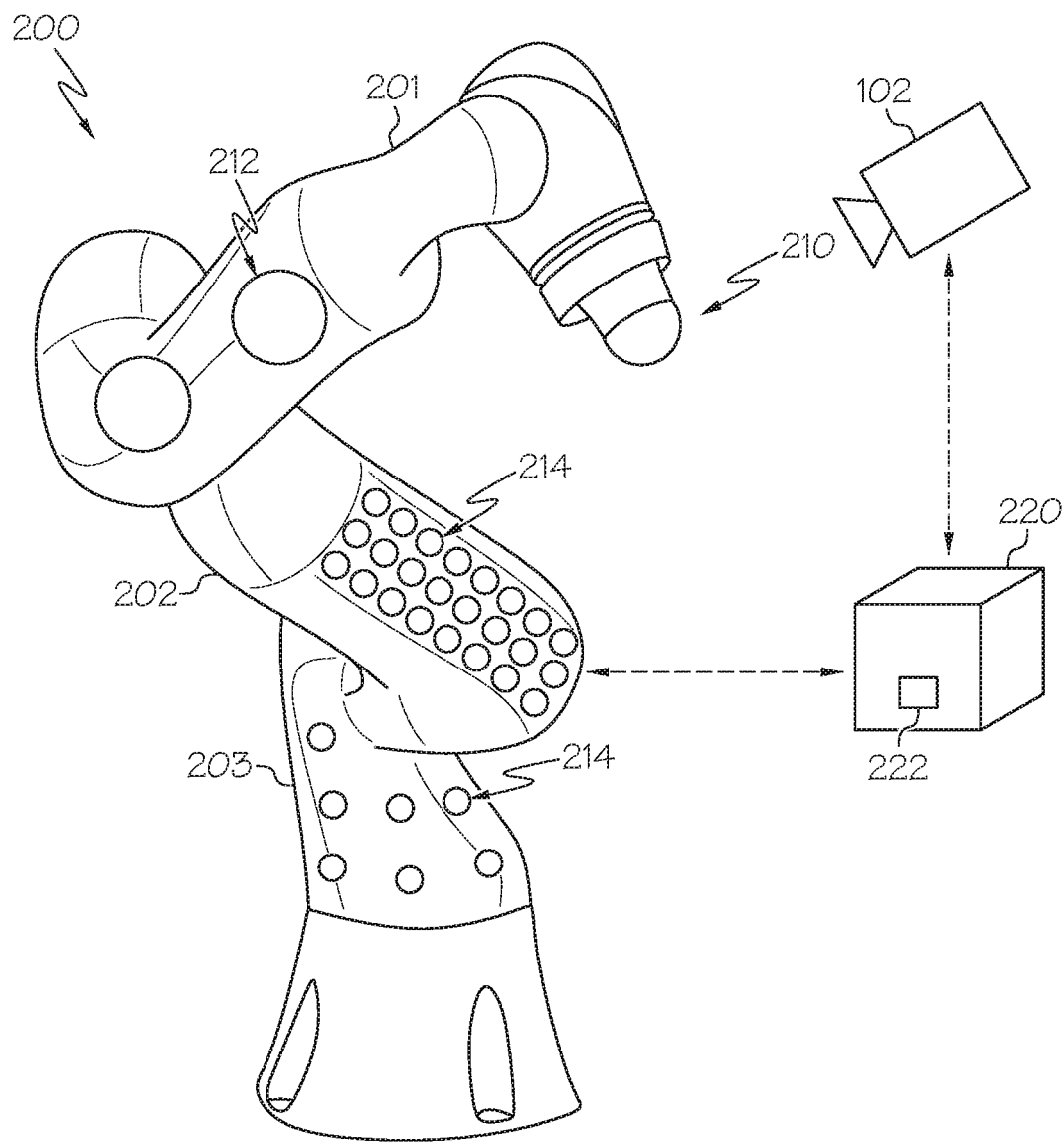
FIG. 2 schematically depicts an example system for calibrating a deformable sensor using an imaging sensor according to one or more embodiments described and illustrated herein.

FIG. 2 depicts a system for monitoring deformable sensors of a robot using an external camera, according to one or more embodiments shown and described herein.

In embodiments, a robot 200 may include a plurality of deformable sensors 210, 212 and 214 at different locations. Each of the plurality of deformable sensors 210, 212, and 214 may have similar structure as the deformable sensor 100 illustrated in FIG. 1A. The deformable sensor 210 may act as an end effector of the robot 200, and have a high spatial resolution and/or depth resolution. In some embodiments, the deformability of the deformable sensor 210 may be a function of some combination of the material of the deformable membrane 120 and the internal pressure within the deformable sensor 210. In some embodiments, the deformable sensor 210 may have a clamp or other suitable attachment mechanism. For example, the deformable sensor 210 may be removably attached to the robot 200. Any suitable type of clamp, fastener, or attachment mechanism may be utilized in some embodiments.

Each of the deformable sensors 210, 212, and 214 may have a desired spatial resolution and/or a desired depth resolution depending on its location on the robot 200. In the illustrated embodiment, deformable sensors 212 are disposed on a first arm portion 201 and a second arm portion 202 (the terms "arm portion" and "portion" being used interchangeably throughout). An arm portion may have one or more deformable sensors 212, or none at all. The deformable sensors 212 may be shaped to conform to the shape of the first arm portion 201 and/or the second arm portion 202. It may be noted that the deformable sensors 212 described herein may take on any shape depending on the application. Deformable sensors 212 may be very flexible and thus deformable. This may be beneficial in human-robot interactions. In this way, the robot 200 may contact a person (e.g., to give the person a "hug") without causing harm due to the softness of the deformable sensors 100' and/or due to an ability to control the force of the contact with an object. The spatial resolution of one or more deformation sensors 212 in the arm portions 201, 202 may be high or low depending on the application. In the example of FIG. 2, the deformable sensors 214 near the base portion 203 of the robot 200 may have low spatial resolution, and may be configured to only detect contact with a target object. The deformability of deformable sensors 214 near the base of the robot 200 may be set based on the application of the robot 200. The depth resolution and/or spatial resolution of the sensors 210, 212, 214 may be varied along different parts of the robot 200. For example, for a portion 203 it may not be necessary to identify the shape and/or pose of an object coming into contact with a particular deformable sensor, as simply registering contact with an object may provide sufficient information, whereas contact with another portion (such as 201) may produce pose and/or shape information derived from the contact. As shown in FIG. 2, deformable sensors 210, 212, 214 may be of any suitable size, which may vary even within an arm portion. Although arm portions 201, 202, 203 are depicted as being discrete/non-overlapping, overlap may occur in other embodiments.

In embodiments, an imaging sensor 102 may capture an image of the deformable sensors 210, 212, and 214. The imaging sensor 102 is positioned external to the deformable sensors. The imaging sensor 102 may be any device having an array of sensing devices (e.g., pixels) capable of detecting radiation in an ultraviolet wavelength band, a visible light wavelength band, or an infrared wavelength band. The imaging sensor 102 may have any resolution. The imaging sensor 102 may be an omni-directional camera, or a panoramic camera. The imaging sensor 102 may capture an image of each of the deformable sensors 210, 212, and 214 at a time. For example, the imaging sensor 102 may capture an image of the deformable membrane of the deformable sensor 210. The image may be a depth image of the deformable membrane of the deformable sensor 210. Then, the imaging sensor 102 may transmit the captured image to a controller 222 of a computing device 220. The computing device 220 may be communicatively coupled to the imaging sensor 102. For example, the imaging sensor 102 may wirelessly transmit the captured image to the computing device 220. As another example, the imaging sensor 102 may be wired to the computing device 220. In some embodiments, the computing device 220 may be included in the imaging sensor 102. In some embodiments, the computing device 220 may be incorporated within the robot 200. The controller 222 may include a processor such as a processor 302 in FIG. 3, memory such as non-volatile memory 308 and/or volatile memory 310 in FIG. 3, and computer readable medium such as computer readable storage medium 316 in FIG. 3, the details of which are described below with reference to FIG. 3.

The controller 222 of the computing device 220 may process the captured image and compare the processed image with a predetermined image for the deformable sensor 210 to determine whether the deformable sensor 210 is in a preferred size and/or shape. The predetermined image for the deformable sensor 210 may be stored in the computing device 220. Details of comparing the images will be described below with reference to FIGS. 4, 5A, and 5B. If it is determined that the deformable sensor 210 is not in a preferred size and/or shape, for example, the contour of the deformable membrane of the deformable sensor 210 is different from the contour of a deformable membrane in the predetermined image, the computing device 220 may control the pump 115 to adjust the volume of medium in the enclosure 113. The imaging sensor 102 may capture an image of another deformable sensor, such as the deformable sensor 212, and process captured image of the deformable sensor 212 and compare the processed image with another predetermined image to determine whether the deformable sensor 212 is in a preferred size and/or shape.

In some embodiments, the imaging sensor 102 may be attached to a moveable arm and move close to the deformable sensor 210, and capture the image of the deformable sensor 210 when the deformable sensor 210 is within a predetermined distance of the imaging sensor 102. In some embodiments, the imaging sensor 102 may capture more than one deformable sensors at a time, and transmit the captured image to the controller 222 of the computing device 220. The controller 222 may process the captured image to identify more than one deformable sensors. For example, the controller 222 may process the captured image to identify the deformable sensor 210 and the deformable sensor 212. Then, the controller 222 may compare the deformable membranes of the deformable sensors 210 and 212 with predetermined images, respectively, in order to determine whether each of the deformable sensors 210 and 212 is in a proper shape and/or size.

While the calibration process above is described with respect to deformable sensors attached to a robot, the calibration process may be performed on deformable sensors that are not attached to a robot. For example, the calibration process may be performed on stand-alone deformable sensors, or on a device other than a robot.

FIG. 3 depicts a block diagram illustrating an example of a computing device 300, through which embodiments of the disclosure can be implemented, such as (by way of non-limiting example) the deformable sensor 100, the internal sensor 130, the robot 200, or any other device described herein. The computing device 300 may correspond to the computing device 220 in FIG. 2. The computing device 300 described herein is but one example of a suitable computing device and does not suggest any limitation on the scope of any embodiments presented. Nothing illustrated or described with respect to the computing device 300 should be interpreted as being required or as creating any type of dependency with respect to any element or plurality of elements. In various embodiments, a computing device 300 may include, but need not be limited to, the deformable sensor 100, the internal sensor 130, the robot 200. In an embodiment, the computing device 300 includes at least one processor 302 and memory (non-volatile memory 308 and/or volatile memory 310). The computing device 300 can include one or more displays and/or output devices 304 such as monitors, speakers, headphones, projectors, wearable-displays, holographic displays, and/or printers, for example. The computing device 300 may further include one or more input devices 306 which can include, by way of example, any type of mouse, keyboard, disk/media drive, memory stick/thumb-drive, memory card, pen, touch-input device, biometric scanner, voice/auditory input device, motion-detector, camera, scale, etc. The processor 302 may correspond to the controller 222 in FIG. 2.

The computing device 300 may include non-volatile memory 308 (ROM, flash memory, etc.), volatile memory 310 (RAM, etc.), or a combination thereof. A network interface 312 can facilitate communications over a network 314 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 312 can be communicatively coupled to any device capable of transmitting and/or receiving data via the network 314. Accordingly, the hardware of the network interface 312 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 316 may comprise a plurality of computer readable mediums, each of which may be either a computer readable storage medium or a computer readable signal medium. A computer readable storage medium 316 may reside, for example, within an input device 306, non-volatile memory 308, volatile memory 310, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive. For example, a robot 200 and/or a server may utilize a computer readable storage medium to store data received from one or more internal sensors 130 on the robot 200. The computer readable storage medium may store machine readable instructions that may be executed by the processor 302. The machine readable instructions, when executed by the processor 302, cause the processor 302 to receive an image of a deformable membrane of a deformable sensor; determine whether a contour of the deformable membrane in the image of the deformable membrane of the deformable sensor corresponds to a predetermined contour; and adjust a volume of the medium in the enclosure of the deformable sensor in response to the determination that the contour of the deformable membrane is different from the predetermined contour.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 300 may include one or more network interfaces 312 to facilitate communication with one or more remote devices, which may include, for example, client and/or server devices. In various embodiments the computing device (for example a robot or deformable sensor) may be configured to communicate over a network with a server or other network computing device to transmit and receive data from one or more deformable sensors 100 on a robot 200. A network interface 312 may also be described as a communications module, as these terms may be used interchangeably.

Figure 4:
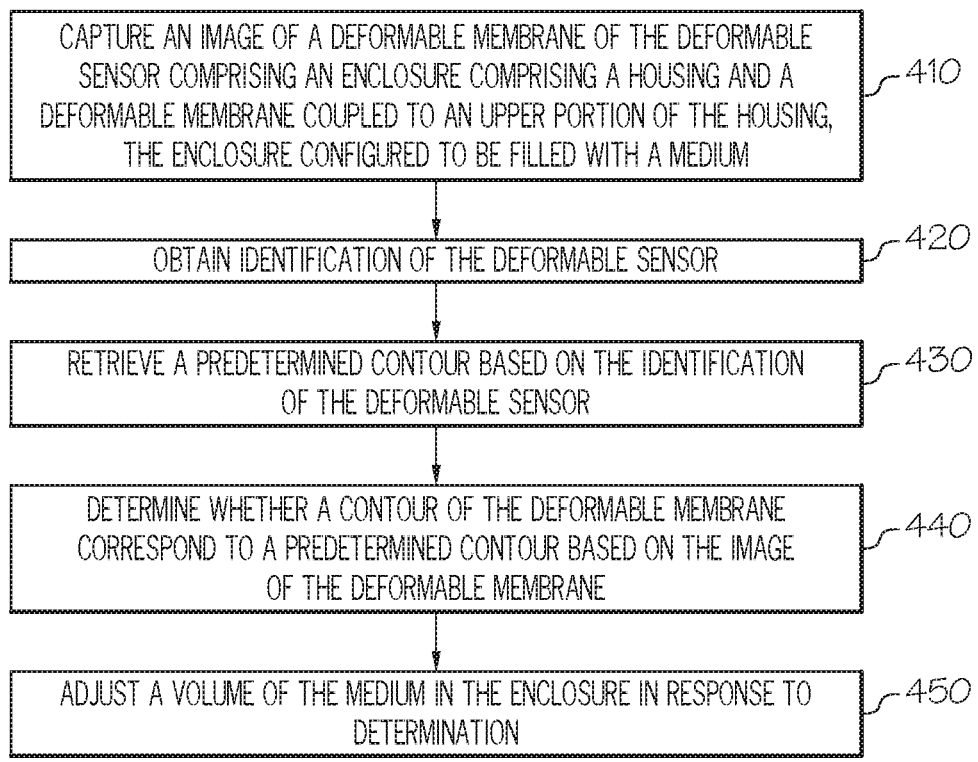
FIG. 4 depicts a flowchart of an example method for calibrating a deformable sensor using an imaging sensor according to one or more embodiments described and illustrated herein.

FIG. 4 depicts a flowchart for adjusting the size and/or shape of the deformable sensor, according to one or more embodiments shown and described herein.

In step 410, the imaging sensor captures an image of a deformable membrane of the deformable sensor. In embodiments, referring to FIG. 2, the imaging sensor 102 may capture the image of the deformable membrane of the deformable sensor 210. The imaging sensor 102 may transmit the captured image of the deformable membrane of the deformable sensor 210 to the controller 222 of the computing device 220.

In step 420, the controller 222 obtains an identification of the deformable sensor. In embodiments, the controller 222 may receive the identification of the deformable sensor 210 from the robot 200. For example, the robot 200 may transmit information about the deformable sensor 210 when the deformation sensor 210 is captured by the imaging sensor 102. In some embodiments, the controller 222 may process the captured image of the imaging sensor 102 and determine the identification of the deformation sensor 210 based on the processed image. For example, the controller 222 may determine the identification of the deformation sensor 210 based on the color, shape, size and/or location of the deformation sensor 210 obtained from the processed image.

In step 430, the controller retrieves a predetermined contour based on the identification of the deformable sensor. In embodiments, a plurality of predetermined contours may be stored in the computing device 220, for example, in the non-volatile memory 308 of the computing device 300. The predetermined contour may be obtained from an image of the deformable membrane of deformable sensor captured when it is determined that the deformable sensor has an ideal shape and/or size. Each of the predetermined contour may represent an ideal contour of the deformable membrane of a deformable sensor. The predetermined contour may be two-dimensional or three-dimensional. Each of the predetermined contours corresponds to each of different deformation sensors. For example, the non-volatile memory 308 of the computing device 300 may store a predetermined contour for the deformation sensor 210, a predetermined contour for the deformation sensor 212, and a predetermined contour for the deformation sensor 214. The predetermined contour for a deformation sensor may be stored in association with a predetermined pressure inside the deformation sensor. In some embodiments, each of the plurality of the predetermined contours may be updated by a user. For example, the user may change the size and/or shape of the predetermined contour.

Figure 5A:
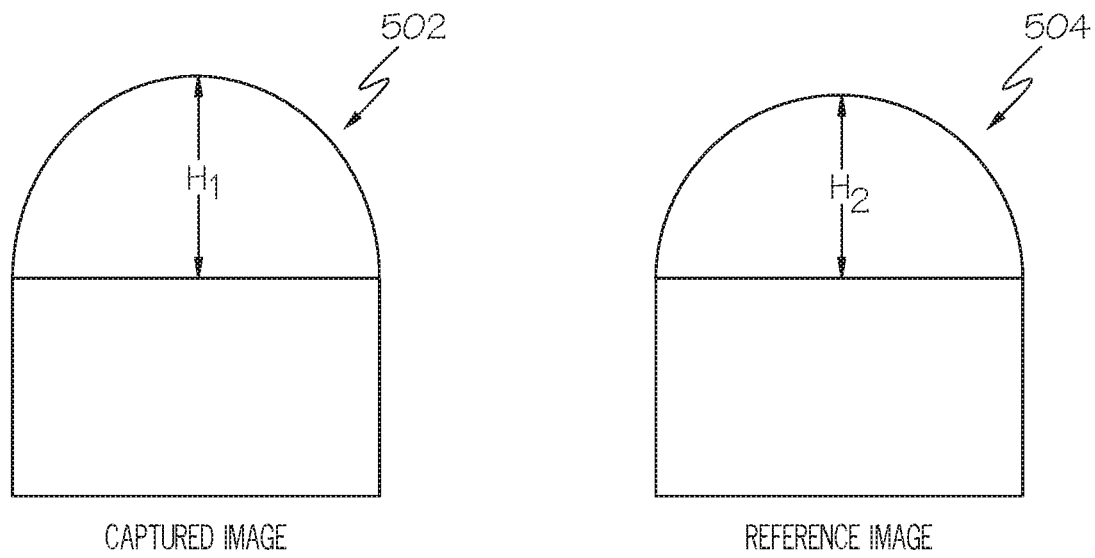
FIG. 5A depicts comparing a captured image of the deformable sensor and a reference image, according to one or more embodiments described and illustrated herein.

In step 440, the controller determines whether a contour of the deformable membrane corresponds to the predetermined contour based on the image of the deformable membrane. Referring to FIG. 5A, the controller 222 may compare the contour 502 of the deformable membrane in the captured image with the predetermined contour 504. The captured image in FIG. 5A may be a captured image of the deformable sensor 210. The predetermined contour 504 may be a predetermined contour retrieved based on the identification of the deformable sensor.

In step 450, the controller adjusts a volume of the medium in the enclosure in response to determination. For example, by referring to FIG. 5A, the contour 502 of the deformable membrane in the captured image is larger than the predetermined contour 504. That is, the height $H_1$ of the contour 502 is greater than the height $H_2$ of the contour 504. In response, the controller 222 may adjust the volume of the medium in the enclosure of the deformable sensor 210. For example, the controller 222 may instruct the pump 115 to remove medium from the enclosure of the deformable sensor 210 until the contour of the deformable sensor 210 matches with the predetermined contour 504. While FIG. 5A depicts the contour 502 and the predetermined contour 504 as two-dimensional, the contour 502 and the predetermined contour 504 may be three-dimensional, and the controller 222 may compare the three-dimensional contour 502 with the three-dimensional contour 504. For example, the controller 222 may compare the three-dimensional depth image of the deformable membrane with a predetermined three-dimensional depth image. In some embodiments, the predetermined contour may be in an arbitrary shape. For example, the predetermined contour may be a shape other the semi-spherical shape of the predetermined contour 504 as shown in FIG. 5A.

Figure 5B:
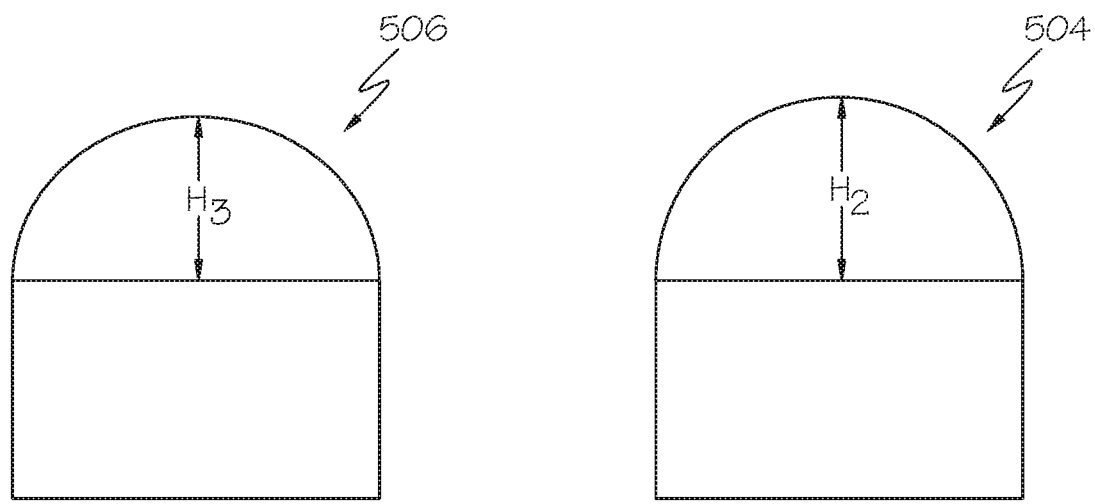
FIG. 5B depicts comparing a captured image of the deformable sensor and a reference image, according to one or more embodiments described and illustrated herein.

As another example, by referring to FIG. 5B, the controller 222 may compare the contour 506 of the deformable membrane in the captured image with the predetermined contour 504. The captured image in FIG. 5B may be a captured image of the deformable sensor 210. The predetermined contour 504 may be a predetermined contour retrieved based on the identification of the deformable sensor. As illustrated in FIG. 5B, for example, the contour 506 of the deformable membrane in the captured image is smaller than the predetermined contour 504. That is, the height $H_3$ of the contour 506 is smaller than the height $H_2$ of the contour 504. In response, the controller 222 may adjust the volume of the medium in the enclosure of the deformable sensor 210. For example, the controller 222 may instruct the pump 115 to provide additional medium to the enclosure of the deformable sensor 210 until the contour of the deformable sensor 210 matches with the predetermined contour 504. While FIG. 5B depicts the contour 506 and the predetermined contour 504 as two-dimensional, the contour 506 and the predetermined contour 504 may be three-dimensional, and the controller 222 may compare the three-dimensional contour 506 with the three-dimensional contour 504.

Figure 6:
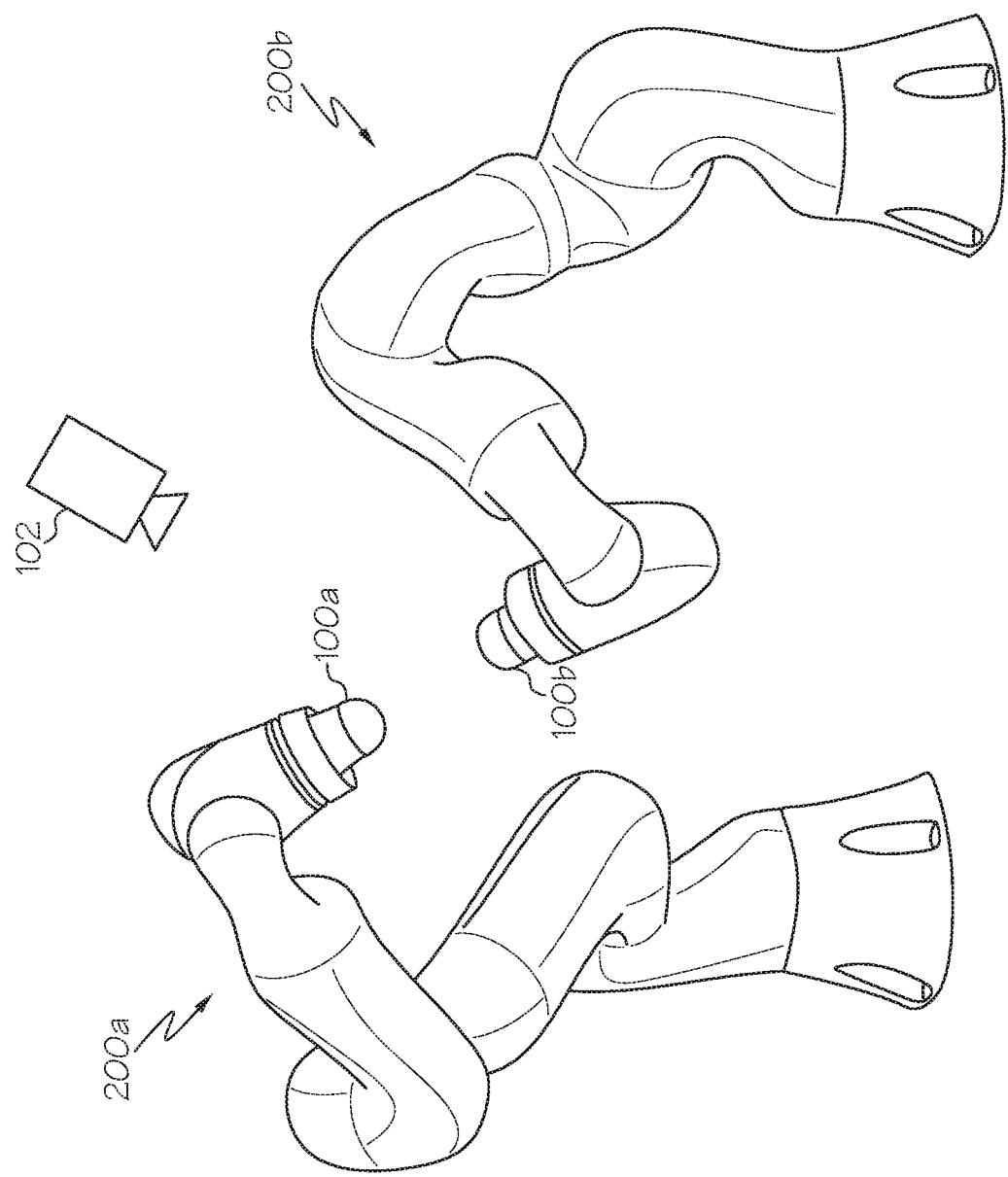
FIG. 6 schematically depicts an example system for calibrating a plurality of deformable sensors using an imaging sensor according to one or more embodiments described and illustrated herein.

FIG. 6 depicts monitoring two different deformable sensors, according to one or more embodiments shown and described herein. As an example non-limiting first robot 200a having a first deformable sensor 100a and an example second robot 200b having a second deformable sensor 100b. As stated above, the deformable sensors 100 described herein may be used as an end effector of a robot to manipulate an object. In embodiments, the imaging sensor 102 may capture the images of the first deformable sensor 100a and the second deformable sensor 100b and determine whether the size and/or the shape of each of the sensor corresponds to a predetermined contour.

Figure 7A:
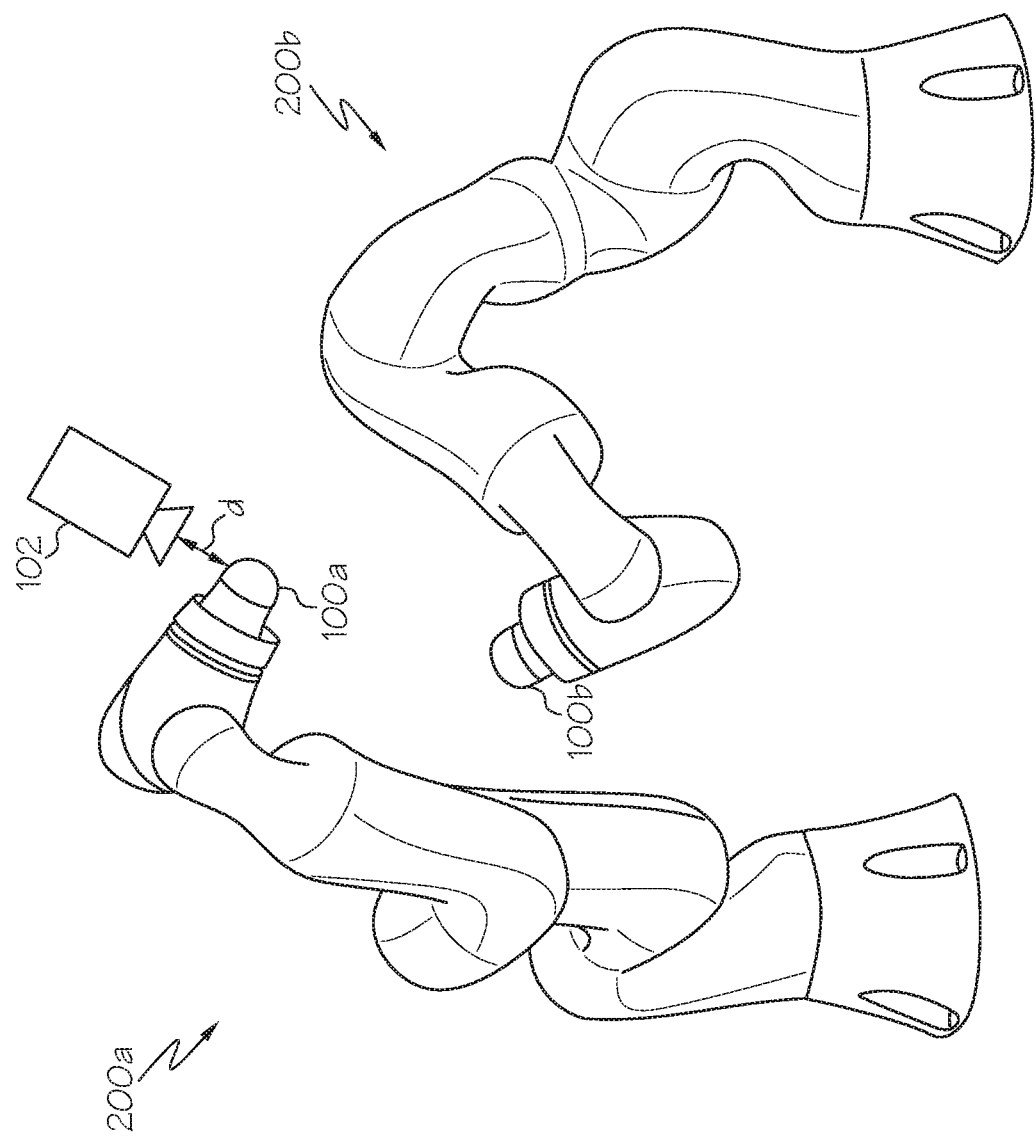
FIG. 7A schematically depicts an example system for calibrating one of a plurality of deformable sensors using an imaging sensor according to one or more embodiments described and illustrated herein.

In embodiments, in order to test whether a deformable sensor has a desired shape and/or size, the imaging sensor 102 may capture each of the deformable sensors 100a and 100b when each of the deformable sensors 100a and 100b is within a predetermined distance of the imaging sensor 102. For example, by referring to FIG. 7A, the robot 200a may move its arm such that the deformable sensor 100a may be within or at a predetermined distance d of the imaging sensor 102. Once the deformable sensor 100a is determined to be within or at the predetermined distance d of the imaging sensor 102, the imaging sensor 102 may capture the image of the deformable sensor 100a. Then, the imaging sensor 102 may transmit the captured image to a controller such as the controller 222 in FIG. 2. The controller 222 may identify the deformable sensor 100a based on the captured image and retrieve a predetermined contour for the deformable sensor 100a based on the identification of the deformable sensor 100a. The captured image of the deformable sensor 100a may be an image of the deformable sensor 100a when the distance between the deformable sensor 100a and the imaging sensor 102 is a predetermined distance d.

In some embodiments, the predetermined contour may be selected among a plurality of predetermined contours based on the distance between the imaging sensor 102 and the deformable sensor 100a. For example, the non-volatile memory 308 of the computing device 300 may store a plurality of predetermined contours for the deformable sensor 100a. Specifically, the non-volatile memory 308 may store a first predetermined contour obtained from an image captured when the distance between the deformable sensor 100a and the imaging sensor 102 is $d_1$ and the deformable membrane of the deformable sensor 100a is in an ideal condition. Similarly, the non-volatile memory 308 may store a second predetermined contour obtained from an image captured when the distance between the deformable sensor 100a and the imaging sensor 102 is $d_2$ and the deformable membrane of the deformable sensor 100a is in an ideal condition. The non-volatile memory 308 may store a third predetermined contour obtained from an image captured when the distance between the deformable sensor 100a and the imaging sensor 102 is $d_3$ and the deformable membrane of the deformable sensor 100a is in an ideal condition. When imaging sensor 102 captures an image of the deformable sensor 100a when the distance between the deformable sensor 100a and the imaging sensor 102 is $d_3$, the computing device 300 may retrieve the third predetermined contour based on the distance.

Figure 7B:
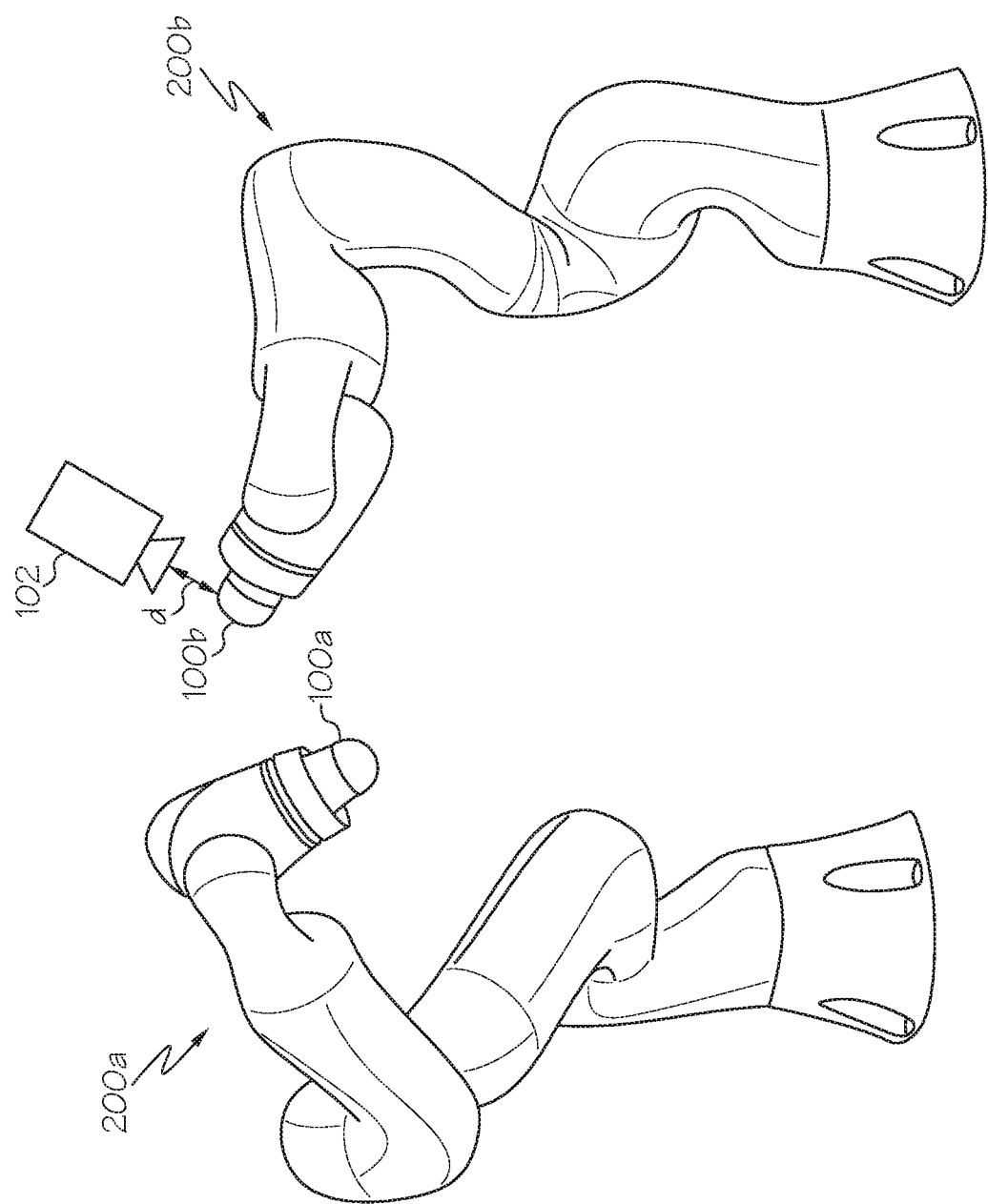
FIG. 7B schematically depicts an example system for calibrating one of a plurality of deformable sensors using an imaging sensor according to one or more embodiments described and illustrated herein.

Once the calibration of the deformable sensor 100a is completed, then the imaging sensor 102 may capture the image of the deformable sensor 100b. For example, by referring to FIG. 7B, the robot 200b may move its arm such that the deformable sensor 100b may be within or at a predetermined distance d of the imaging sensor 102. Once the deformable sensor 100b is determined to be within or at the predetermined distance d of the imaging sensor 102, the imaging sensor 102 may capture the image of the deformable sensor 100b. Then, the imaging sensor 102 may transmit the captured image to a controller such as the controller 222 in FIG. 2. The controller 222 may identify the deformable sensor 100b based on the captured image and retrieve a predetermined contour for the deformable sensor 100b based on the identification of the deformable sensor 100b. The captured image of the deformable sensor 100b may be an image of the deformable sensor 100b when a distance between the deformable sensor 100b and the imaging sensor 102 is a predetermined distance d.

Figure 7C:
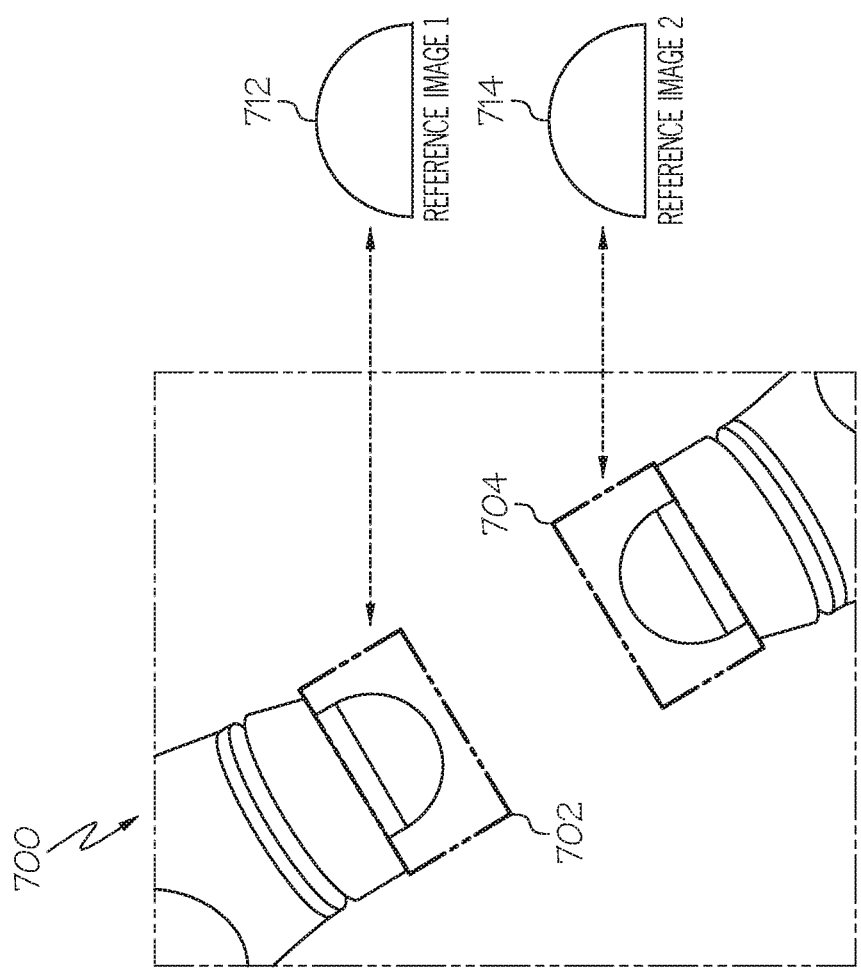
FIG. 7C depicts an example captured image of a plurality of deformable sensors according to one or more embodiments described and illustrated herein.

In some embodiments, the imaging sensor 102 may capture more than one deformable sensor at a time. By referring to FIGS. 6 and 7C, the imaging sensor 102 may capture an image 700 of the deformable sensors 100a and 100b. In this example, the robots 200a and 200b may not need to stretch their arm to move the deformable sensors 100a and 100b closer to the imaging sensor 102. The imaging sensor 102 may transmit the captured image 700 to the controller 222 of the computing device 220. The controller 222 may process the captured image 700 to identify portions 702 and 704 including images of the deformable sensors 100a and 100b, respectively. The controller 222 may process the captured image and determine identifications of the deformable sensors 100a and 100b. For example, the controller 222 processes the captured image 700 and determines that the portion 702 corresponds to the deformable sensor 100a and the portion 704 corresponds to the deformable sensor 100b. Then, the controller 222 retrieves a predetermined contour 712 or a first reference image for the deformable sensor 100a based on the determined identification of the deformable sensor 100a and a predetermined contour 714 or a second reference image for the deformable sensor 100b. The controller 222 may compare the contour of the deformable sensor 100a in the portion 702 with the predetermined contour 712 and adjust the volume of the medium in the deformable sensor 100a based on the comparison. Similarly, the controller 222 may compare the contour of the deformable sensor 100b in the portion 704 with the predetermined contour 714 and adjust the volume of the medium in the deformable sensor 100b based on the comparison.

FIG. 8 schematically depicts robots having deformable sensors interacting with an external object. In this illustrated example, the first robot 200a and the second robot 200a may cooperate for dual arm manipulation wherein both the first deformable sensor 100a and the second deformable sensor 100b contact the object 215. As stated above, the deformable sensors 100 described herein may be used as an end effector of a robot to manipulate an object. The deformable sensor 100 may allow a robot to handle an object 215 that is fragile due to the flexible nature of the deformable membrane 120. Further, the deformable sensor 100 may be useful for robot-to-human contact because in some embodiments the deformable membrane 120 may be softer and/or more flexible/deformable, rather than rigid (non-deformable or nearly so) to the touch.

In addition to geometry and pose estimation, the deformable sensor 100 may be used to determine how much force a robot 200a (or other device) is exerting on the target object 215. Although reference is made to first robot 200a, any such references may in some embodiments utilize second robot 200b, any other suitable devices, and/or any combinations thereof. This information may be used by the robot 200a to more accurately grasp objects 215. For example, the displacement of the deformable membrane 120 may be modeled. The model of the displacement of the deformable membrane 120 may be used to determine how much force is being applied to the target object 215. The determined force as measured by the displacement of the deformable membrane 120 may then be used to control a robot 200a to more accurately grasp objects 215. As an example, the amount of force a robot 200a (discussed in more detail below) applies to a fragile object 215 may be of importance so that the robot 200a does not break the object 215 that is fragile. In some embodiments an object 215 may be assigned a softness value (or fragility value), where the robot 200a may programmed to interact with all objects 215 based upon the softness value (which may be received at a processor, for example, from a database, server, user input, etc.). In some embodiments a user interface may be provided to specify any suitable value (pressure within the deformable sensor 100 in FIG. 1, softness value pertaining to an object 215, etc.) for initialization and/or updating. In other embodiments a robot 200a may be able to identify specific objects 215 (such as via object recognition in a vision system, etc.) whereby the softness value may be modified, which may lead to utilization of another deformable sensor 100 having a more suitable deformability, aggregate spatial resolution, depth resolution, pressure, and/or material for the deformable membrane 120.

Figure 9:
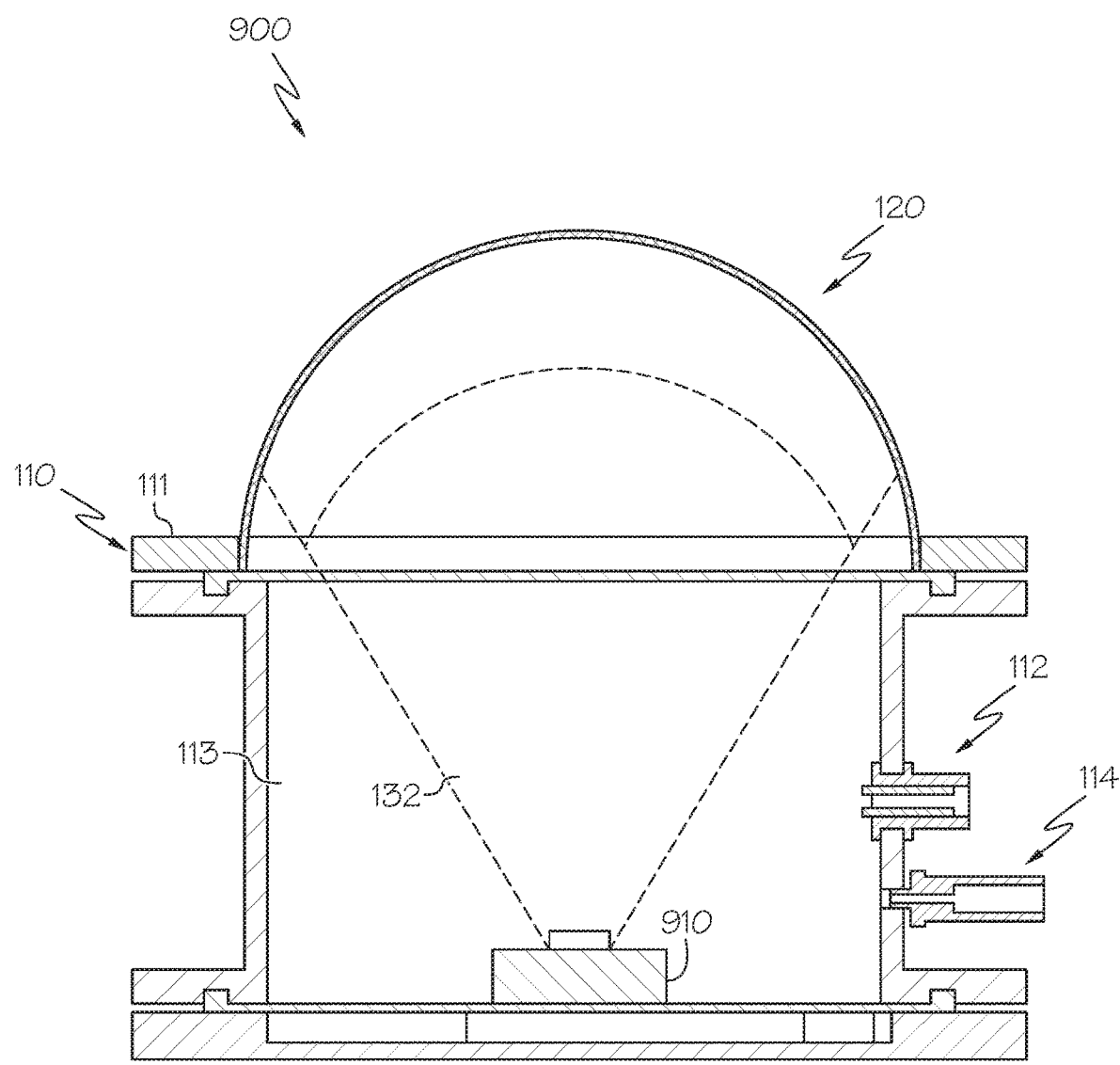
FIG. 9 schematically depicts an elevation view of an example deformable sensor with an image sensor embedded therein according to one or more embodiments described and illustrated herein.

FIG. 9 depicts an example deformable sensor according to another embodiment described and illustrated herein.

The example deformable sensor 900 generally comprises a housing 110 and a deformable membrane 120 coupled to the housing 110, such as by an upper portion 111 of the housing 110. The housing 110 and the deformable membrane 120 define an enclosure 113 that is filled with a medium through one or more passthroughs 112, which may be a valve or any other suitable mechanism. The passthrough 112 may be utilized to fill or empty the enclosure. In one example, the medium is gas, such as air. Thus, air may be pumped into the enclosure 113 to a desired pressure such that the deformable membrane 120 forms a dome shape as shown in FIG. 1, although any suitable shape may be utilized in other embodiments. The passthrough 112 may be connected to a pump 115 which provides gas, such as air, into the enclosure 113. In another example, the medium is a gel, such as silicone or other rubber-like substance. In some embodiments a substance such as solid silicone may be cast in a given shape before assembly of the deformable sensor 100. In various embodiments, the medium may be anything that is transparent to an internal sensor (discussed in more detail below), such as to a wavelength of a time of flight sensor. The medium may include clear/transparent rubbers in some embodiments. In other embodiments, the medium may be a liquid. In some examples, the deformable membrane 120 and the medium within the enclosure 113 may be fabricated of the same material, such as, without limitation, silicone. In some embodiments the deformable sensor 100 may be mountable. For example, the enclosure 113 may include brackets to be mounted any suitable object (such as a robot) or material. The deformable membrane 120 may be a latex or any other suitable material, such as a suitably thin, non-porous, rubber-like material.

The deformable sensor 100 may include an internal sensor (not shown in FIG. 9) similar to the internal sensor 130 in FIG. 1. In addition, the deformable sensor 100 may include an imaging sensor 910. The imaging sensor 910 may be disposed within the enclosure 113. The imaging sensor 910 may capture the image of the inner surface of the deformable membrane 120. Then, the imaging sensor 102 may transmit the captured image to a controller such as the controller 222 in FIG. 2. The controller 222 may retrieve a predetermined contour for the inner surface of the deformable membrane 120 of the deformable sensor 900. The predetermined contour for the inner surface of the deformable membrane 120 may be stored in the memory of the computing device 300 such as the non-volatile memory 308 or the volatile memory 310. Then, the controller 222 may compare the predetermined contour of the inner surface of the deformable membrane 120 with the contour in the captured image. Based on the comparison, the controller 222 adjusts a volume of the medium in the enclosure 113 in response to determination.

Figure 10:
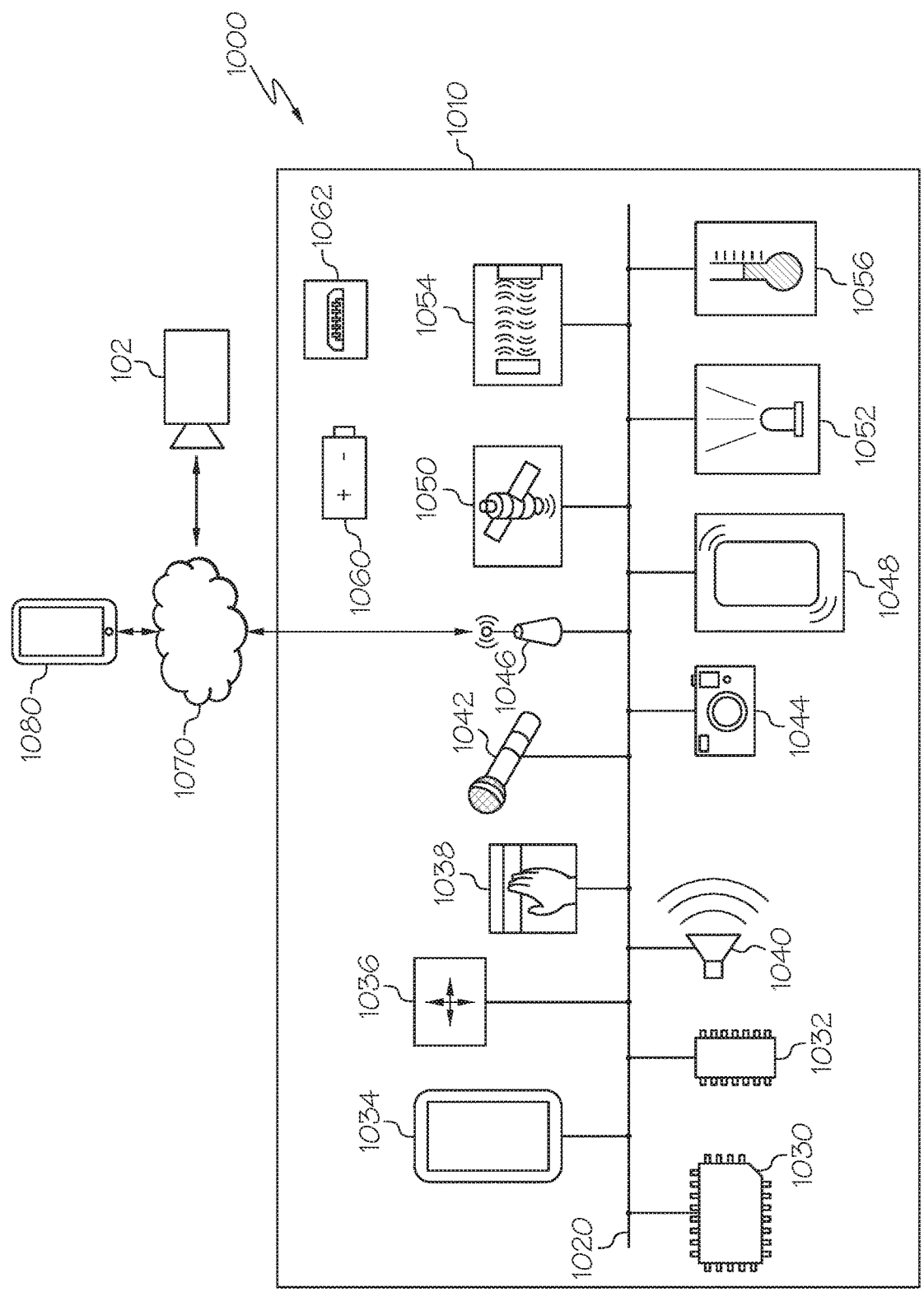
FIG. 10 is a block diagram illustrating example hardware utilized in one or more robots for implementing various processes and systems, according one or more embodiments described and illustrated herein.

Turning now to FIG. 10, example components of one non-limiting embodiment of a robot 1000 is schematically depicted. The robot 1000 may correspond to the robot 200 in FIG. 2. The robot 1000 includes a housing 1010, a communication path 1020, a processor 1030, a memory module 1032, a tactile display 1034, an inertial measurement unit 1036, an input device 1038, an audio output device 1040 (e.g., a speaker), a microphone 1042, a camera 1044, network interface hardware 1046, a tactile feedback device 1048, a location sensor 1050, a light 1052, a proximity sensor 1054, a temperature sensor 1056, a battery 1060, and a charging port 1062. The components of the robot 1000 other than the housing 1010 may be contained within or mounted to the housing 1010. The various components of the robot 1000 and the interaction thereof will be described in detail below. Embodiments of the present disclosure are not limited the components shown in FIG. 10, and the robot 1000 may include more or fewer components than the components illustrated in FIG. 10.

Still referring to FIG. 10, the communication path 1020 may be formed from any medium that is capable of transmitting a signal such as, for example, conductive wires, conductive traces, optical waveguides, or the like. Moreover, the communication path 1020 may be formed from a combination of mediums capable of transmitting signals. In one embodiment, the communication path 1020 comprises a combination of conductive traces, conductive wires, connectors, and buses that cooperate to permit the transmission of electrical data signals to components such as processors, memories, sensors, input devices, output devices, and communication devices. Accordingly, the communication path 1020 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 1020 communicatively couples the various components of the robot 1000. As used herein, the term "communicatively coupled" means that coupled components are capable of exchanging data signals with one another such as, for example, electrical signals via conductive medium, electromagnetic signals via air, optical signals via optical waveguides, and the like.

The processor 1030 of the robot 1000 may be any device capable of executing machine-readable instructions. Accordingly, the processor 1030 may be a controller, an integrated circuit, a microchip, a computer, or any other computing device. The processor 1030 may be communicatively coupled to the other components of the robot 1000 by the communication path 1020. This may, in various embodiments, allow the processor 1030 to receive data from the one or more deformable sensors 100 which may be part of the robot 1000. In other embodiments, the processor 1030 may receive data directly from one or more internal sensors which are part of one or more deformable sensors 100 on a robot 1000. Accordingly, the communication path 1020 may communicatively couple any number of processors with one another, and allow the components coupled to the communication path 1020 to operate in a distributed computing environment. Specifically, each of the components may operate as a node that may send and/or receive data. While the embodiment depicted in FIG. 10 includes a single processor 1030, other embodiments may include more than one processor.

Still referring to FIG. 10, the memory module 1032 of the robot 1000 is coupled to the communication path 1020 and communicatively coupled to the processor 1030. The memory module 1032 may, for example, contain instructions to detect a shape of an object that has deformed the deformable membrane 120 of a deformable sensor 100. In this example, these instructions stored in the memory module 1032, when executed by the processor 1030, may allow for the determination of the shape of an object based on the observed deformation of the deformable membrane 120. The memory module 1032 may comprise RAM, ROM, flash memories, hard drives, or any non-transitory memory device capable of storing machine-readable instructions such that the machine-readable instructions can be accessed and executed by the processor 1030. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 1032. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 10 includes a single memory module 1032, other embodiments may include more than one memory module.

The tactile display 1034, if provided, is coupled to the communication path 1020 and communicatively coupled to the processor 1030. The tactile display 1034 may be any device capable of providing tactile output in the form of refreshable tactile messages. A tactile message conveys information to a user by touch. For example, a tactile message may be in the form of a tactile writing system, such as Braille. A tactile message may also be in the form of any shape, such as the shape of an object detected in the environment. The tactile display 1034 may provide information to the user regarding the operational state of the robot 1000.

Any known or yet-to-be-developed tactile display may be used. In some embodiments, the tactile display 1034 is a three dimensional tactile display including a surface, portions of which may raise to communicate information. The raised portions may be actuated mechanically in some embodiments (e.g., mechanically raised and lowered pins). The tactile display 1034 may also be fluidly actuated, or it may be configured as an electrovibration tactile display.

The inertial measurement unit 1036, if provided, is coupled to the communication path 1020 and communicatively coupled to the processor 1030. The inertial measurement unit 1036 may include one or more accelerometers and one or more gyroscopes. The inertial measurement unit 1036 transforms sensed physical movement of the robot 1000 into a signal indicative of an orientation, a rotation, a velocity, or an acceleration of the robot 1000. The operation of the robot 1000 may depend on an orientation of the robot 1000 (e.g., whether the robot 1000 is horizontal, tilted, and the like). Some embodiments of the robot 1000 may not include the inertial measurement unit 1036, such as embodiments that include an accelerometer but not a gyroscope, embodiments that include a gyroscope but not an accelerometer, or embodiments that include neither an accelerometer nor a gyroscope.

Still referring to FIG. 10, one or more input devices 1038 are coupled to the communication path 1020 and communicatively coupled to the processor 1030. The input device 1038 may be any device capable of transforming user contact into a data signal that can be transmitted over the communication path 1020 such as, for example, a button, a switch, a knob, a microphone or the like. In various embodiments an input device 1038 may be a deformable sensor 100 and/or an internal sensor as described above. In some embodiments, the input device 1038 includes a power button, a volume button, an activation button, a scroll button, or the like. The one or more input devices 1038 may be provided so that the user may interact with the robot 1000, such as to navigate menus, make selections, set preferences, and other functionality described herein. In some embodiments, the input device 1038 includes a pressure sensor, a touch-sensitive region, a pressure strip, or the like. It should be understood that some embodiments may not include the input device 1038. As described in more detail below, embodiments of the robot 1000 may include multiple input devices disposed on any surface of the housing 1010. In some embodiments, one or more of the input devices 1038 are configured as a fingerprint sensor for unlocking the robot. For example, only a user with a registered fingerprint may unlock and use the robot 1000.

The speaker 1040 (i.e., an audio output device) is coupled to the communication path 1020 and communicatively coupled to the processor 1030. The speaker 1040 transforms audio message data from the processor 1030 of the robot 1000 into mechanical vibrations producing sound. For example, the speaker 1040 may provide to the user navigational menu information, setting information, status information, information regarding the environment as detected by image data from the one or more cameras 1044, and the like. However, it should be understood that, in other embodiments, the robot 1000 may not include the speaker 1040.

The microphone 1042 is coupled to the communication path 1020 and communicatively coupled to the processor 1030. The microphone 1042 may be any device capable of transforming a mechanical vibration associated with sound into an electrical signal indicative of the sound. The microphone 1042 may be used as an input device 1038 to perform tasks, such as navigate menus, input settings and parameters, and any other tasks. It should be understood that some embodiments may not include the microphone 1042.

Still referring to FIG. 10, the camera 1044 is coupled to the communication path 1020 and communicatively coupled to the processor 1030. The camera 1044 may be any device having an array of sensing devices (e.g., pixels) capable of detecting radiation in an ultraviolet wavelength band, a visible light wavelength band, or an infrared wavelength band. The camera 1044 may have any resolution. The camera 1044 may be an omni-directional camera, or a panoramic camera. In some embodiments, one or more optical components, such as a mirror, fish-eye lens, or any other type of lens may be optically coupled to the camera 1044.

The network interface hardware 1046 is coupled to the communication path 1020 and communicatively coupled to the processor 1030. The network interface hardware 1046 may be any device capable of transmitting and/or receiving data via a network 1070. Accordingly, network interface hardware 1046 can include a wireless communication module configured as a communication transceiver for sending and/or receiving any wired or wireless communication. For example, the network interface hardware 1046 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 1046 includes hardware configured to operate in accordance with the Bluetooth wireless communication protocol. In another embodiment, network interface hardware 1046 may include a Bluetooth send/receive module for sending and receiving Bluetooth communications to/from a portable electronic device 1080. The network interface hardware 1046 may also include a radio frequency identification ("RFID") reader configured to interrogate and read RFID tags.

In some embodiments, the robot 1000 may be communicatively coupled to a portable electronic device 1080 and the imaging sensor 102 via the network 1070. In some embodiments, the network 1070 is a personal area network that utilizes Bluetooth technology to communicatively couple the robot 1000 and the portable electronic device 1080. In other embodiments, the network 1070 may include one or more computer networks (e.g., a personal area network, a local area network, or a wide area network), cellular networks, satellite networks and/or a global positioning system and combinations thereof. Accordingly, the robot 1000 can be communicatively coupled to the network 1070 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 10, as stated above, the network 1070 may be utilized to communicatively couple the robot 1000 with the portable electronic device 1080. The portable electronic device 1080 may include a mobile phone, a smartphone, a personal digital assistant, a camera, a dedicated mobile media player, a mobile personal computer, a laptop computer, and/or any other portable electronic device capable of being communicatively coupled with the robot 1000. The portable electronic device 1080 may include one or more processors and one or more memories. The one or more processors can execute logic to communicate with the robot 1000. The portable electronic device 1080 may be configured with wired and/or wireless communication functionality for communicating with the robot 1000. In some embodiments, the portable electronic device 1080 may perform one or more elements of the functionality described herein, such as in embodiments in which the functionality described herein is distributed between the robot 1000 and the portable electronic device 1080.

The tactile feedback device 1048 is coupled to the communication path 1020 and communicatively coupled to the processor 1030. The tactile feedback device 1048 may be any device capable of providing tactile feedback to a user. The tactile feedback device 1048 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 1048.

The location sensor 1050 is coupled to the communication path 1020 and communicatively coupled to the processor 1030. The location sensor 1050 may be any device capable of generating an output indicative of a location. In some embodiments, the location sensor 1050 includes a global positioning system (GPS) sensor, though embodiments are not limited thereto. Some embodiments may not include the location sensor 1050, such as embodiments in which the robot 1000 does not determine a location of the robot 1000 or embodiments in which the location is determined in other ways (e.g., based on information received from the camera 1044, the microphone 1042, the network interface hardware 1046, the proximity sensor 1054, the inertial measurement unit 1036 or the like). The location sensor 1050 may also be configured as a wireless signal sensor capable of triangulating a location of the robot 1000 and the user by way of wireless signals received from one or more wireless signal antennas.

Still referring to FIG. 10, the light 1052 is coupled to the communication path 1020 and communicatively coupled to the processor 1030. The light 1052 may be any device capable of outputting light, such as, but not limited to, a light emitting diode, an incandescent light, a fluorescent light, or the like. Some embodiments include a power indicator light that is illuminated when the robot 1000 is powered on. Some embodiments include an activity indicator light that is illuminated when the robot 1000 is active or processing data. Some embodiments include an illumination light for illuminating the environment in which the robot 1000 is located. Some embodiments may not include the light 1052.

The proximity sensor 1054 is coupled to the communication path 1020 and communicatively coupled to the processor 1030. The proximity sensor 1054 may be any device capable of outputting a proximity signal indicative of a proximity of the robot 1000 to another object. In some embodiments, the proximity sensor 1054 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. Some embodiments may not include the proximity sensor 1054, such as embodiments in which the proximity of the robot 1000 to an object is determine from inputs provided by other sensors (e.g., the camera 1044, the speaker 1040, etc.) or embodiments that do not determine a proximity of the robot 1000 to an object 1015.

The temperature sensor 1056 is coupled to the communication path 1020 and communicatively coupled to the processor 1030. The temperature sensor 1056 may be any device capable of outputting a temperature signal indicative of a temperature sensed by the temperature sensor 1056. In some embodiments, the temperature sensor 1056 may include a thermocouple, a resistive temperature device, an infrared sensor, a bimetallic device, a change of state sensor, a thermometer, a silicon diode sensor, or the like. Some embodiments of the robot 1000 may not include the temperature sensor 1056.

Still referring to FIG. 10, the robot 1000 is powered by the battery 1060, which is electrically coupled to the various electrical components of the robot 1000. The battery 1060 may be any device capable of storing electric energy for later use by the robot 1000. In some embodiments, the battery 1060 is a rechargeable battery, such as a lithium-ion battery or a nickel-cadmium battery. In embodiments in which the battery 1060 is a rechargeable battery, the robot 1000 may include the charging port 1062, which may be used to charge the battery 1060. Some embodiments may not include the battery 1060, such as embodiments in which the robot 1000 is powered the electrical grid, by solar energy, or by energy harvested from the environment. Some embodiments may not include the charging port 1062, such as embodiments in which the apparatus utilizes disposable batteries for power.

It should now be understood that embodiments of the present disclosure are directed to calibrating the size and shape of the deformable sensors using an imaging sensor external to the deformable sensors or an imaging sensor embedded within the deformable sensors. Particularly, the pressure disclosure provides a system for calibrating a deformable sensor. The system includes a deformable sensor including a housing, a deformable membrane coupled to an upper portion of the housing, and an enclosure defined by the housing and the deformable member; an imaging sensor configured to capture an image of the deformable membrane of the deformable sensor; and a controller. The enclosure is configured to be filled with a medium. The controller is configured to: receive the image of the deformable membrane of the deformable sensor; determine whether a contour of the deformable membrane in the image of the deformable membrane of the deformable sensor corresponds to a predetermined contour; and adjust a volume of the medium in the enclosure of the deformable sensor in response to the determination that the contour of the deformable membrane is different from the predetermined contour. By adjusting the volume of the medium in the deformable sensor based on the comparison between the captured image and the predetermined contour, the present disclosure appropriately sets the size and shape of the deformable sensor before detecting an object using the deformable sensor. This allows precise sensing of an external object by the deformable sensor.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for calibrating a deformable sensor, the system comprising:
    a deformable sensor comprising:
        a housing,
        a deformable membrane coupled to an upper portion of the housing, and
        an enclosure defined by the housing and the deformable membrane, the enclosure configured to be filled with a medium;
    an imaging sensor configured to capture an image of the deformable membrane of the deformable sensor;
    a memory including a predetermined contour associated with a predetermined pressure; and
    a controller configured to:
        determine whether a contour of the deformable membrane in the image of the deformable membrane of the deformable sensor without being contacted with an external object corresponds to the predetermined contour associated with the predetermined pressure; and
        adjust a volume of the medium in the enclosure of the deformable sensor in response to the determination that the contour of the deformable membrane is different from the predetermined contour associated with the predetermined pressure.

2. The system of claim 1, wherein the controller is configured to increase the volume of the medium in the enclosure of the deformable sensor in response to the determination that the contour of the deformable membrane is smaller than the predetermined contour.

3. The system of claim 1, wherein the controller is configured to decrease the volume of the medium in the enclosure of the deformable sensor in response to the determination that the contour of the deformable membrane is greater than the predetermined contour.

4. The system of claim 1, wherein the imaging sensor is disposed external to the deformable sensor and configured to capture an image of an exterior of the deformable membrane of the deformable sensor.

5. The system of claim 1, wherein the imaging sensor is disposed within the enclosure of the deformable sensor and configured to capture an image of an interior of the deformable membrane of the deformable sensor.

6. The system of claim 1, wherein the controller is configured to:
    obtain identification of the deformable sensor; and
    retrieve the predetermined contour based on the identification of the deformable sensor.

7. The system of claim 1, further comprising:
a robotic arm configured to move the deformable sensor, wherein the controller is configured to:
instruct the robotic arm to move the deformable sensor to be at a predetermined distance from the imaging sensor; and
instruct the imaging sensor to capture the image of the deformable membrane in response to the deformable sensor being at the predetermined distance from the imaging sensor.

8. The system of claim 1, further comprising:
another deformable sensor comprising an enclosure comprising a housing and a deformable membrane coupled to an upper portion of the housing, the enclosure configured to be filled with a medium,
wherein the controller is configured to:
receive the image of the deformable membrane of the another deformable sensor;
determine whether the contour of the deformable membrane of the another deformable sensor correspond to another predetermined contour based on the image of the deformable membrane of the another deformable sensor; and
adjust a volume of the medium in the enclosure in response to the determination.

9. The system of claim 8, wherein the controller is configured to:
obtain identification of the another deformable sensor; and
retrieve the another predetermined contour based on the identification of the another deformable sensor.

10. The system of claim 1, wherein the imaging sensor is configured to capture a depth image of the deformable membrane of the deformable sensor;
the predetermined contour is a contour of a deformable membrane in a predetermined depth image; and
the controller is configured to:
determine whether the contour of the deformable membrane in the depth image of the deformable membrane of the deformable sensor corresponds to the contour of the deformable membrane in the predetermined depth image; and
adjust the volume of the medium in the enclosure of the deformable sensor in response to the determination that the contour of the deformable membrane in the depth image of the deformable membrane of the deformable sensor is different from the contour of the deformable membrane in the predetermined depth image.

11. A method for calibrating a deformable sensor, the method comprising:
receiving an image of a deformable membrane of the deformable sensor without being contacted with an external object, the deformable sensor having an enclosure defined by a housing and the deformable membrane coupled to an upper portion of the housing, the enclosure configured to be filled with a medium;
determining whether a contour of the deformable membrane in the image of the deformable membrane of the deformable sensor corresponds to a predetermined contour; and
adjusting a volume of the medium in the enclosure of the deformable sensor in response to the determination that the contour of the deformable membrane is different from the predetermined contour associated with the predetermined pressure.

12. The method of claim 11, further comprising:
increasing the volume of the medium in the enclosure of the deformable sensor in response to the determination that the contour of the deformable membrane is smaller than the predetermined contour.

13. The method of claim 11, further comprising:
decreasing the volume of the medium in the enclosure of the deformable sensor in response to the determination that the contour of the deformable membrane is greater than the predetermined contour.

14. The method of claim 11, further comprising:
obtaining identification of the deformable sensor; and
retrieving the predetermined contour based on the identification of the deformable sensor.

15. The method of claim 11, further comprising:
instructing a robotic arm to move the deformable sensor to be at a predetermined distance from an imaging sensor; and
instructing the imaging sensor to capture the image of the deformable membrane in response to the deformable sensor being at the predetermined distance from the imaging sensor.

16. A controller comprising:
one or more processors;
one or more memory modules communicatively coupled to the one or more processors; and
machine readable instructions stored in the one or more memory modules that, when executed by the one or more processors, cause the one or more processors to perform at least the following:
receive an image of a deformable membrane of a deformable sensor without being contacted with an external object, the deformable sensor having an enclosure defined by a housing and a deformable membrane coupled to an upper portion of the housing, the enclosure configured to be filled with a medium;
determine whether a contour of the deformable membrane in the image of the deformable membrane of the deformable sensor corresponds to a predetermined contour; and
adjust a volume of the medium in the enclosure of the deformable sensor in response to the determination that the contour of the deformable membrane is different from the predetermined contour associated with the predetermined pressure.

17. The controller of claim 16, wherein the machine readable instructions stored in the one or more memory modules, when executed by the one or more processors, cause the one or more processors to:
increase the volume of the medium in the enclosure of the deformable sensor in response to the determination that the contour of the deformable membrane is smaller than the predetermined contour.

18. The controller of claim 16, wherein the machine readable instructions stored in the one or more memory modules, when executed by the one or more processors, cause the one or more processors to:
decrease the volume of the medium in the enclosure of the deformable sensor in response to the determination that the contour of the deformable membrane is greater than the predetermined contour.

19. The controller of claim 16, wherein the machine readable instructions stored in the one or more memory modules, when executed by the one or more processors, cause the one or more processors to:
obtain identification of the deformable sensor; and
retrieve the predetermined contour based on the identification of the deformable sensor.

20. The controller of claim 16, wherein the machine readable instructions stored in the one or more memory modules, when executed by the one or more processors, cause the one or more processors to:
- instruct a robotic arm to move the deformable sensor to be at a predetermined distance from an imaging sensor; and
- instruct the imaging sensor to capture the image of the deformable membrane in response to the deformable sensor being at the predetermined distance from the imaging sensor.

* * * * *